US005704349A

United States Patent [19]
Hubbard et al.

[11] Patent Number: 5,704,349
[45] Date of Patent: *Jan. 6, 1998

[54] SURGICAL FACE MASK WITH DARKENED GLARE-REDUCING STRIP AND VISOR

[75] Inventors: Vance M. Hubbard; Welton K. Brunson, both of Bedford, Tex.

[73] Assignee: Tecnol Medical Products, Inc., Fort Worth, Tex.

[*] Notice: The term of this patent shall not extend beyond the expiration date of Pat. No. 4,920,960.

[21] Appl. No.: 328,381

[22] Filed: Oct. 21, 1994

Related U.S. Application Data

[63] Continuation of Ser. No. 886,386, May 19, 1992, Pat. No. 5,383,450, which is a continuation of Ser. No. 661,435, Feb. 25, 1991, Pat. No. 5,150,703, which is a continuation of Ser. No. 268,558, Nov. 8, 1988, Pat. No. 5,020,533, which is a continuation-in-part of Ser. No. 104,807, Oct. 2, 1987, Pat. No. 4,920,960.

[51] Int. Cl.⁶ .................. A62B 7/10; A62B 18/02; A62B 23/02; A62B 18/08
[52] U.S. Cl. .................. 128/206.19; 128/206.23; 128/206.28; 128/201.17; 128/857
[58] Field of Search .................. 128/857, 858, 128/206.12, 206.19, 206.21–206.23, 201.15, 201.17, 206.28

[56] References Cited

U.S. PATENT DOCUMENTS

| | | | |
|---|---|---|---|
| D. 249,072 | 8/1978 | Revoir | 29/2 |
| D. 270,110 | 8/1983 | Moore et al. | D2/3 |
| D. 285,733 | 9/1986 | Cooper . | |
| D. 287,649 | 1/1987 | Zdrok et al. | D29/7 |
| D. 312,331 | 11/1990 | Poettgen | D29/8 |
| D. 319,111 | 8/1991 | Sandel et al. | D29/9 |
| D. 326,932 | 6/1992 | Millar | D29/9 |
| D. 327,141 | 6/1992 | Hubbard et al. | D29/9 |
| D. 355,485 | 2/1995 | Hubbard et al. | D24/110.2 |

(List continued on next page.)

FOREIGN PATENT DOCUMENTS

| | | |
|---|---|---|
| 1085259 | 8/1978 | Canada . |
| 0032422 | 7/1981 | European Pat. Off. . |
| 391726 | 4/1990 | European Pat. Off. . |
| 867791 | 11/1941 | France . |
| 1511186 | 12/1966 | France . |
| 2471792 | 12/1979 | France . |
| 655814 | 1/1938 | Germany . |
| 688227 | 2/1940 | Germany . |
| 2335160 | 7/1973 | Germany . |
| 2717968 | 4/1977 | Germany . |
| 8809551 | 9/1988 | Germany . |
| 7706660 | 6/1977 | Netherlands . |
| 254667 | 12/1948 | Switzerland . |
| 4789 | of 1912 | United Kingdom . |

(List continued on next page.)

OTHER PUBLICATIONS

Advertisement, IC Products Disposable Face Shield (no date).
Advertisement, Digi Sportlens Systems (no date).
Civil Action No. 3–94CV–2284X Expert Opinion Report, Robert C. Eberhart, date of service May 6, 1996.
Annotated Figure 2 from 4,419,993.
"The Condensed Chemical Dictionary", copyright 1961, pub. by Reinhold Publishing Corp., N.Y., Sixth Ed., pp. 826, 827, 910–912.

(List continued on next page.)

*Primary Examiner*—Kimberly L. Asher
*Attorney, Agent, or Firm*—Baker & Botts, L.L.P.

[57] ABSTRACT

A clear plastic visor (16) is secured to a mask (12) which is removably attachable to the face of a wearer. The visor (16) is secured to the mask (12) at bond areas (48, 50) on opposite ends of the mask (12). The visor (16) is provided with a notched keyhole (20) to allow the visor (16) to conform to contours of the face of the wearer and to prevent creasing thereof. The visor (16) is generally positioned on the mask (12) so that approximately ⅓ of the visor's depth (D) covers the mask (12). A darkened strip (22) may be added to the top edge of the mask (12) to further reduce the likelihood of glare and reflections.

14 Claims, 2 Drawing Sheets

U.S. PATENT DOCUMENTS

| | | | |
|---|---|---|---|
| D. 355,714 | 2/1995 | Hubbard et al. | D24/110.2 |
| D. 355,715 | 2/1995 | Hubbard et al. | D24/110.2 |
| 797,293 | 8/1905 | Lang et al. | |
| 911,476 | 2/1909 | Cheesman | |
| 1,170,052 | 2/1916 | Diener | |
| 1,292,095 | 1/1919 | Schwartz | |
| 1,337,036 | 4/1920 | Bergmann | |
| 1,923,340 | 8/1933 | Steckler | 2/174 |
| 1,987,922 | 1/1935 | Blatt | 128/139 |
| 2,012,505 | 8/1935 | Goldsmith | |
| 2,029,947 | 2/1936 | Schmitt et al. | 128/146 |
| 2,033,691 | 3/1936 | Douglass | 2/174 |
| 2,056,753 | 10/1936 | Wagner | 128/141 |
| 2,116,241 | 5/1938 | Heumann | 128/139 |
| 2,149,067 | 2/1939 | Otero | 128/139 |
| 2,176,006 | 10/1939 | Ehrlich | 2/13 |
| 2,227,667 | 1/1941 | Panettiere | 128/139 |
| 2,253,101 | 8/1941 | Thoreson | 2/13 |
| 2,280,055 | 4/1942 | Andersen | 2/14 |
| 2,280,482 | 4/1942 | Dreyfus | 2/14 |
| 2,296,338 | 9/1942 | Dakin | 128/145 |
| 2,462,005 | 2/1949 | Schauweker | 128/146 |
| 2,494,406 | 1/1950 | Reitano | 128/146 |
| 2,634,724 | 4/1953 | Burns | 128/146 |
| 2,669,717 | 2/1954 | Diggs | 2/9 |
| 2,720,477 | 10/1955 | Lancaster | 154/53.5 |
| 2,762,368 | 9/1956 | Bloomfield | 128/146 |
| 2,774,970 | 12/1956 | Du Bois | 2/0 |
| 2,891,541 | 6/1959 | Tietze | 128/141 |
| 2,907,041 | 10/1959 | Finn | 2/14 |
| 2,916,037 | 12/1959 | Hansen | 128/284 |
| 3,049,121 | 8/1962 | Brumfield et al. | 128/146 |
| 3,170,461 | 2/1965 | Watts, Jr. | 128/146 |
| 3,220,409 | 11/1965 | Liloia et al. | 128/146 |
| 3,288,138 | 11/1966 | Sachs | 128/139 |
| 3,316,904 | 5/1967 | Wall et al. | 128/146.6 |
| 3,395,406 | 8/1968 | Smith | 2/14 |
| 3,490,447 | 1/1970 | Jackson | 128/139 |
| 3,603,315 | 9/1971 | Becker, III | 128/146.2 |
| 3,613,678 | 10/1971 | Mayhew | 128/146.2 |
| 3,620,214 | 11/1971 | Thockston | 128/146.2 |
| 3,651,616 | 3/1972 | Blanchard et al. | 55/16 |
| 3,664,335 | 5/1972 | Boucher et al. | 128/146.6 |
| 3,686,690 | 8/1972 | Webb | 2/9 |
| 3,688,768 | 9/1972 | Reimschussel et al. | 128/146.2 |
| 3,736,928 | 6/1973 | Andersson et al. | 128/146.2 |
| 3,779,244 | 12/1973 | Weeks, Jr. et al. | 128/146.2 |
| 3,802,429 | 4/1974 | Bird | |
| 3,834,384 | 9/1974 | Raines | 128/146.2 |
| 3,837,995 | 9/1974 | Floden | 161/150 |
| 3,855,048 | 12/1974 | Bagnall | 161/159 |
| 3,884,227 | 5/1975 | Lutz et al. | 128/146.2 |
| 3,888,246 | 6/1975 | Lauer | 128/146.2 |
| 3,890,966 | 6/1975 | Aspelin et al. | 128/146.2 |
| 3,929,135 | 12/1975 | Thompson | 128/287 |
| 3,932,153 | 1/1976 | Byrns | 55/511 |
| 3,953,566 | 4/1976 | Gore | 264/288 |
| 3,971,369 | 7/1976 | Aspelin et al. | 128/146.2 |
| 3,971,373 | 7/1976 | Braun | 128/146.2 |
| 3,974,829 | 8/1976 | Tate, Jr. | 128/146.2 |
| 3,985,132 | 10/1976 | Boyce et al. | 128/146.2 |
| 3,989,867 | 11/1976 | Sisson | 428/132 |
| 4,011,067 | 3/1977 | Carey, Jr. | 55/354 |
| 4,037,593 | 7/1977 | Tate, Jr. | 128/146.2 |
| 4,041,203 | 8/1977 | Brock et al. | 428/157 |
| 4,064,876 | 12/1977 | Mulchi | 128/146.6 |
| 4,084,585 | 4/1978 | Venaleck | 128/146.2 |
| 4,122,847 | 10/1978 | Craig | 128/132 R |
| 4,187,390 | 2/1980 | Gore | 174/102 |
| 4,195,629 | 4/1980 | Halford | 128/206.13 |
| 4,196,245 | 4/1980 | Kitson et al. | 428/198 |
| 4,215,682 | 8/1980 | Kubik et al. | 128/205.29 |
| 4,296,746 | 10/1981 | Mason, Jr. et al. | 128/201.15 |
| 4,300,549 | 11/1981 | Parker | 128/206.19 |
| 4,319,567 | 3/1982 | Magidson | 128/206.19 |
| 4,323,063 | 4/1982 | Fisichella | 128/139 |
| 4,384,577 | 5/1983 | Huber et al. | 128/206.19 |
| 4,417,575 | 11/1983 | Hilton et al. | 128/206.19 |
| 4,419,993 | 12/1983 | Petersen | 128/201.15 |
| 4,419,994 | 12/1983 | Hilton | 128/206.19 |
| 4,435,852 | 3/1984 | Nesler | 2/436 |
| 4,451,562 | 5/1984 | Elgas et al. | 435/2 |
| 4,454,881 | 6/1984 | Huber et al. | 128/206.15 |
| 4,464,797 | 8/1984 | Glassman | 2/199 |
| 4,508,113 | 4/1985 | Malaney | 128/132 D |
| 4,510,931 | 4/1985 | Henderson et al. | 128/202.28 |
| 4,522,203 | 6/1985 | Mays | 128/132 D |
| 4,536,440 | 8/1985 | Berg | 428/284 |
| 4,547,420 | 10/1985 | Krueger et al. | 428/229 |
| 4,551,378 | 11/1985 | Carey, Jr. | 428/198 |
| 4,589,408 | 5/1986 | Singer | 128/132 R |
| 4,600,002 | 7/1986 | Maryyanek et al. | 128/206.19 |
| 4,606,341 | 8/1986 | Hubbard et al. | 128/206.19 |
| 4,610,036 | 9/1986 | LaPrairie | 2/12 |
| 4,616,647 | 10/1986 | McCreadie | 128/206.19 |
| 4,628,927 | 12/1986 | Ward | 128/206.17 |
| 4,635,628 | 1/1987 | Hubbard et al. | 128/201.17 |
| 4,641,645 | 2/1987 | Tayebi | 128/206.19 |
| 4,643,182 | 2/1987 | Klein | 128/201.25 |
| 4,646,367 | 3/1987 | El Hassen | 2/411 |
| 4,657,802 | 4/1987 | Morman | 428/152 |
| 4,662,005 | 5/1987 | Grier-Idris | 2/9 |
| 4,684,570 | 8/1987 | Malaney | 428/296 |
| 4,688,566 | 8/1987 | Boyce | 128/206.19 |
| 4,701,965 | 10/1987 | Landis | 2/428 |
| 4,779,291 | 10/1988 | Russell | 2/439 |
| 4,796,621 | 1/1989 | Barle et al. | 128/206.23 |
| 4,797,956 | 1/1989 | Boyce | 128/858 |
| 4,802,473 | 2/1989 | Hubbard et al. | 128/206.19 |
| 4,807,619 | 2/1989 | Dyrud et al. | 128/206.16 |
| 4,821,340 | 4/1989 | Johnson | 2/9 |
| 4,825,878 | 5/1989 | Kuntz et al. | 128/857 |
| 4,827,924 | 5/1989 | Japuntich | 128/206.12 |
| 4,850,347 | 7/1989 | Skov | 128/206.16 |
| 4,852,185 | 8/1989 | Olson | 2/9 |
| 4,852,189 | 8/1989 | Duggan | 2/452 |
| 4,856,509 | 8/1989 | Lemelson | 128/206.19 |
| 4,864,653 | 9/1989 | Landis | 2/9 |
| 4,872,465 | 10/1989 | Kuntz et al. | 128/857 |
| 4,873,972 | 10/1989 | Magidson et al. | 128/206.12 |
| 4,883,052 | 11/1989 | Weiss et al. | 128/205.27 |
| 4,883,547 | 11/1989 | Japuntich | 156/73.4 |
| 4,884,296 | 12/1989 | Nix, Jr. | 2/11 |
| 4,910,804 | 3/1990 | Lidgren | 2/209.3 |
| 4,920,576 | 5/1990 | Landis | 2/9 |
| 4,920,960 | 5/1990 | Hubbard et al. | 128/206.12 |
| 4,941,470 | 7/1990 | Hubbard et al. | 128/206.13 |
| 4,944,294 | 7/1990 | Borek, Jr. | 128/206.19 |
| 4,944,312 | 7/1990 | Smith | 128/857 |
| 4,945,574 | 8/1990 | Dagher | 2/9 |
| 4,951,664 | 8/1990 | Niemeyer | 128/206.24 |
| 4,965,887 | 10/1990 | Paoluccio et al. | 2/9 |
| 4,966,140 | 10/1990 | Herzberg | 128/206.19 |
| 4,969,457 | 11/1990 | Hubbard et al. | 128/206.12 |
| 5,003,633 | 4/1991 | Itoh | 2/9 |
| 5,012,805 | 5/1991 | Muckerheide | 128/205.28 |
| 5,020,533 | 6/1991 | Hubbard et al. | 128/206.23 |
| 5,025,506 | 6/1991 | Huang | 2/206 |
| 5,033,115 | 7/1991 | Bowling | 2/51 |
| 5,035,240 | 7/1991 | Braun et al. | 128/205.27 |
| 5,062,421 | 11/1991 | Burns | 128/205.27 |
| 5,086,768 | 2/1992 | Niemeyer | 128/205.24 |

| | | | |
|---|---|---|---|
| 5,094,236 | 3/1992 | Tayebi | 128/206.12 |
| 5,107,547 | 4/1992 | Scheu | 2/206 |
| 5,113,528 | 5/1992 | Burke, Jr. et al. | 2/9 |
| 5,138,714 | 8/1992 | Smith | 2/9 |
| 5,150,703 | 9/1992 | Hubbard et al. | 128/206.12 |
| 5,240,479 | 8/1993 | Bachinski | 55/103 |
| 5,307,796 | 5/1994 | Kronzer et al. | 123/206.16 |
| 5,374,458 | 12/1994 | Burgio | 428/36.1 |
| 5,383,450 | 1/1995 | Hubbard et al. | 128/206.23 |
| 5,446,925 | 9/1995 | Baker et al. | 2/9 |

FOREIGN PATENT DOCUMENTS

| | | |
|---|---|---|
| 5104 | 12/1913 | United Kingdom . |
| 892262 | 7/1960 | United Kingdom . |
| 967455 | 12/1960 | United Kingdom . |
| 1049604 | 11/1966 | United Kingdom . |
| 1433504 | 4/1976 | United Kingdom . |
| 1473924 | 5/1977 | United Kingdom . |
| 2028664 | 3/1980 | United Kingdom . |
| 1588442 | 4/1981 | United Kingdom . |
| 2103491 | 2/1983 | United Kingdom . |
| WO8101019 | 11/1979 | WIPO . |
| WO8103266 | 5/1981 | WIPO . |
| WO8900874 | 7/1988 | WIPO . |
| WO8910106 | 4/1989 | WIPO . |

OTHER PUBLICATIONS

Visimask Advertisement, W.M. Supplies (U.K.) Ltd., U.K.
Visimask for Medical Personnel Protection, W.M. Medical, U.K.
Photo of Mask Unlabelled.
Tecnol Fluidshield Surgical Masks Featuring SplashGuard Visors Brochure, Tecnol, Inc. Nov. 1992.
The Mask Collection Tecnol brochure, AORN Journal, 1987.
Tecnol Fluid Shield Brochure, "The First Mask Specifically Designed to Resist Fluid Penetration".
Combo–Cone, Anti–Fog Eye Shield Attached to Fluid Resistant Cone Mask, Barriers for Diseases (A Division of BFD Industries Ltd. Partnership).
Eyewear, *The Surgical Technologist*, Nov. 1992, p. 18, by Oberon.
Op–d–op, Inc. visor shield, Materials Management, Mar. 1992, patent #4701965.
Splash Protection from Eye Communications, Supervisor. "Splash Mask", Incon.
Face Shield Disposable by BFW, SCM Medical, IC Products, and Eye Communications "Splash Protection for Eyeglasses".
Med–Vue Protecive Eye Wear.
"Delta Disposable Respirators" *Racal Health & Safety*, 1993 (4 pages).
R1050 AO Safety Products brochure, Dust Demon Foldable, Reusable/Disposable Respirator.
Glendale brochure, Dustbuster Comfort Plus Full Dust and Mist Protection Jul. 1992 10M.
Tecnol Fluidshield Brochure, "The Only Masks With Loncet Breathable Film . . . Your Extra protection from Body Fluids".
W.T. Davis, "Filtration Efficiency of Surgical Face Masks: The Need for More Meaningful Standards," *American Journal of Infection Control*, pp. 16–18.
Busse hospital Disposables brochure, "If you think your mask is nothing like this one, better take a closer look." No date.
ShieldMate™, *Mask/Eye Shield* MPS Dec. 1988.
Catalogue, Busse Hospital Disposables pp. 0241–0244, (no date).
Brochure, *Barrier\* Face Masks*, Johnson & Johnson Medical, Inc. (date illegible).
Brochure, *1820 Earloop FW's Resistant Isolation Face Mask*, 3M Health Care (Aug. 15, 1992).
Distributor Price List, Precept, Jan. 1, 1982 (2 pages).
Price List, BFD, Inc., Sep. 1, 1988 (1 page).
Pricing Letter & Grade 9762 Data Sheet, C.H. Dexter Division The Dexter Corporation, Dec. 4, 1987.
Correspondence with Attachments, Food and Drug Administration, Apr. 27, 1983.
Correspondence with Attachments, Food and Drug Administration, Oct. 21, 1986.
Corespondence, Food and Drug Administration, Dec. 2, 1987.
Correspondence, Food and Drug Aministration, Nov. 2, 1987.
Correspondence, Food and Drug Administration, Jul. 26, 1983.
Memorandum, Joseph Randolph, K '8807'57, Mar. 4, 1988 (best available copy).
807.87 Surgical Face Mask, 2 pages (no date).
Illustration, 1818 Tie–On Mask, no date (best available copy).
Catalogue, American Surgical Mask, 1 pg. (no date).
Correspondence, Food and Drug Administration, Feb. 24, 1988.
Correspondence, Food and Drug Aministration, 510K Pre–Market Notification, Feb. 24, 1988.
Memorandum, Joseph Randolph, Jul. 20, 1983.
*Dexter Stasis Fabrics*, C.H. Dexter Division, The Dexter Coproration, oct. 1, 1987 (1pg.).
Letter to Beth Rizer from Phil McCann, dated Jan. 8, 1982.
Product Information, Busse Hospital Disposables, 2 pages (no date, Attachment to Jan. 8, 1982 letter).
Letter to Ray O'Hara from C.A. Preston, dated Sep. 24, 1982.
Dexter Medical Fabrics, Price List, 1 page, dated Jun. 1981.
381 Mask Prep Steps, Handwritten Notes, 2 pages, date included in note; Mar. 2, 1982.
C.H. Dexter Division, Busse #381 Iso Mask, Test Results, May 20, 1982.

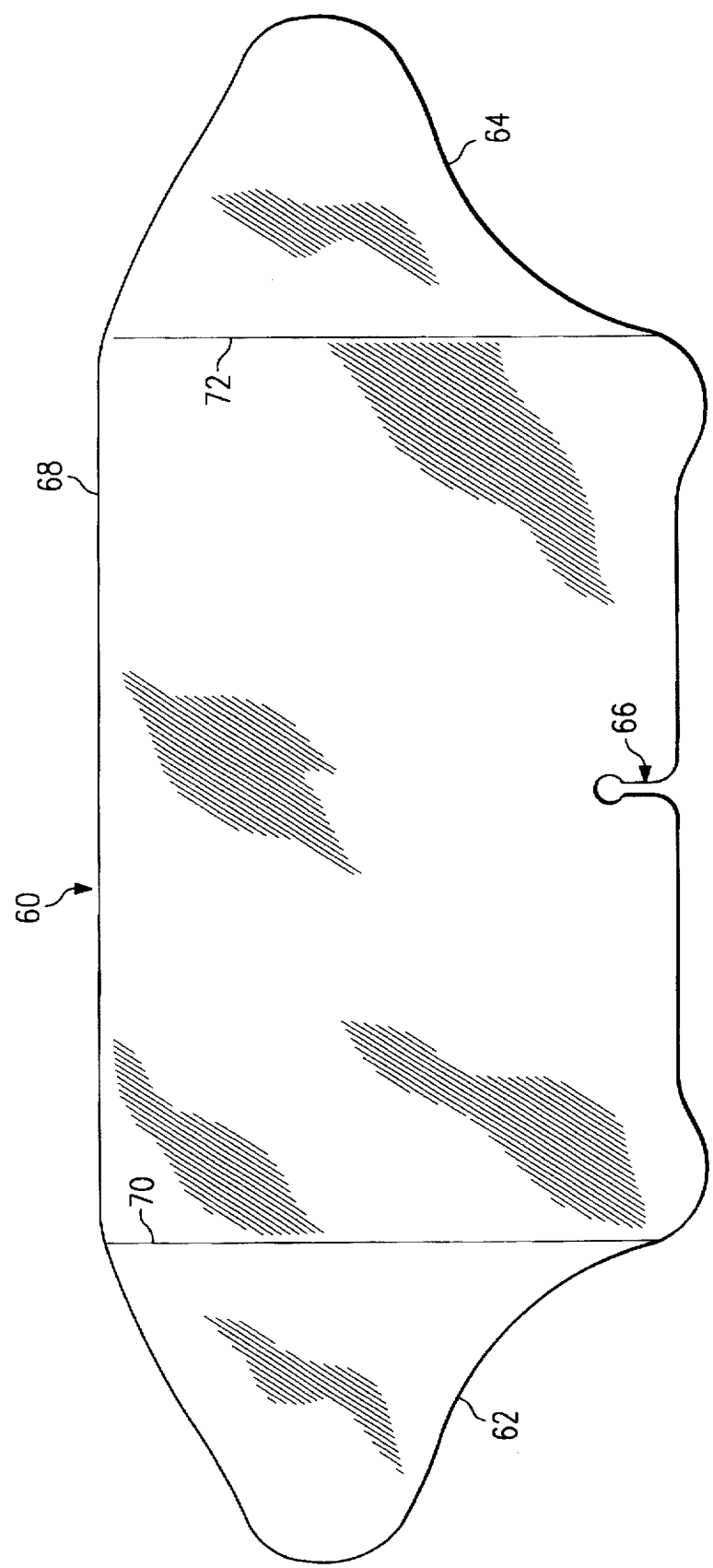

SURGICAL FACE MASK WITH DARKENED GLARE-REDUCING STRIP AND VISOR

CROSS-REFERENCE TO RELATED APPLICATIONS

This application is a continuation application of U.S. application Ser. No. 07/886,386, filed May 19, 1992 by Vance M. Hubbard and Welton K. Brunson and entitled Liquid Shield Visor for a Surgical Mask, now U.S. Pat. No. 5,383,450, issued Jan. 24, 1995; which is a continuation of U.S. application Ser. No. 07/661,435 filed Feb. 25, 1991 by Vance M. Hubbard and Welton K. Brunson entitled Liquid Shield Visor for a Surgical Mask with a Bottom Notch to Reduce Glare, now U.S. Pat. No. 5,150,703 issued Sep. 29, 1992; which is continuation of U.S. application Ser. No. 07/268,558 filed Nov. 8, 1988 Vance M. Hubbard and Welton K. Brunson entitled Face Mask with a Liquid and Glare Resistant Visor, now U.S. Pat. No. 5,020,533 issued Jun. 4, 1991; which is a continuation-in-part of U.S. application Ser. No. 07/104,807 filed Oct. 2, 1987 by Vance M. Hubbard, Welton K. Brunson and Darrell S. Caldwell entitled Body Fluids Barrier Mask, now U.S. Pat. No. 4,920,960 issued May 1, 1990, all owned by the present assignee of record.

This application is related to U.S. Design application Ser. No. 29/010,567 filed Jul. 12, 1993 by Vance M. Hubbard and Welton K. Brunson entitled Combined Face Mask and Shield; U.S. Design application No. 29/010,606 filed Jul. 12, 1993 by Vance M. Hubbard and Welton K. Brunson entitled Combined Face Mask and Shield; and U.S. Design application Ser. No. 29/010,581 filed Jul. 13, 1993 by Vance M. Hubbard and Welton K. Brunson for Combined Face Mask and Shield.

TECHNICAL FIELD OF INVENTION

This invention relates in general to disposable medical products, and in particular to a disposable face mask with a visor to prevent liquid from contacting the eyes of a wearer.

BACKGROUND OF INVENTION

The wearing of a protective face mask has become standard procedure in many health care and other related activities. The use of a face mask is important, for example, to lab technicians during the conduction of tests, to nurses in the care of contagious patients, to physicians during surgery and to dentists working in a patient's mouth.

With the rapid increase in the spread of infectious diseases such as AIDS, the use of protective equipment, including masks, has become even more important. The Center for Disease Control in Atlanta, Ga., has found that AIDS can be passed by contact with body fluids. Contact of AIDS contaminated body fluids with another person's source of body fluids, i.e. eyes, nose, mouth, etc., can pass the disease. It is therefore necessary to prevent a patient's body fluids from contacting the eyes, nose and mouth of an attendant.

The typical previously developed protective mask covers the wearer's face from the bridge of the nose to below the chin, and is generally designed to filter out germs and other particulates. Unfortunately, a mask designed to prevent the passage of germs has little value in preventing liquids from reaching the face, and thus normal face masks provide the wearer with no protection against the patient's body fluids which may contain the AIDS virus. A face mask designed to prevent the passage of liquids from the exterior of the mask to the face of the wearer is disclosed in co-pending U.S. application Ser. No. 104,807, Oct. 2, 1987, now U.S. Pat. No. 4,920,960 issued May 1, 1990, to Hubbard et al, entitled Body Fluids Barrier Mask. The Hubbard mask prevents splashed or thrown liquids from penetrating through the mask to the wearer's mouth and nose, which is particularly important due to the aforementioned spread of AIDS. However, the Hubbard mask does not provide protection for the eyes.

Other protective masks, such as the Irema Shield Mate (Catalog No. SM5000), while serving to generally keep liquids from the eyes of a wearer, are susceptible to problems which detract from their effectiveness. In such masks, a solid sheet of relatively stiff clear plastic is fixed by double sided tape to opposite ends of the mask. When the mask is placed on a wearer's face, the plastic tends to remain flat and therefore pulls away from the contours of the face creating gaps. Additionally, the tendency of the visor to remain straight forces the plastic into the wearer's forehead which causes discomfort, and it is necessary to add a foam strip across the top edge of the visor to provide a comfortable fit as well as to prevent oils and perspiration from fouling the visor. The gaps between the visor and the mask are, obviously, openings for the liquids which are supposed to be excluded.

If the wearer of the Irema Shield Mate mask attempts to compensate for failure of the plastic to conform to their face, over compensation generally results and the plastic is creased. Plastic is susceptible to glare and reflections, and a crease in the plastic tends to increase the glare and reflections by providing more surfaces for light to strike.

Another liquid shield is available from Ballard Medical Products under the product name Safety Shield Kit. The Safety Shield Kit contains a protective mask, a separate eyeshield and a pair of latex gloves. The eyeshield is similar to a pair of goggles with its own elastic fastener for securing around the wearer's head. The multiple components of the Ballard Kit detract from the convenience of a one piece shield. Thus, there is a need for a convenient protective eye shield visor that will prevent the passage of liquid to the eyes of the wearer, will not crease and does not reflect glare into the eyes.

SUMMARY OF THE INVENTION

The present invention disclosed herein comprises a method and apparatus for a fluid shield visor for a face mask which substantially eliminates or reduces problems associated with prior eye shield masks. The present invention inhibits the passage of liquids through the visor to the eyes of a wearer without becoming creased or reflecting glare into the eyes of the wearer.

In one aspect of the present invention, a cover comprises a liquid shield visor secured to a mask that is resistant to the passage of liquids from exterior the mask to the face of the wearer. The liquid shield visor comprises clear plastic such as polyethylene or polyester having a notched cutout to facilitate conformance to various facial configurations and reduce the likelihood of reflections. Additionally, the mask may be provided with a darkened strip of material to further reduce the likelihood of reflections and glare.

It is a technical advantage of the present invention that the mask may be worn without the need for a separate eye protection device. It is a further technical advantage that the shield will allow the mask to conform to the contours of the face of a wearer without creasing the visor. It is a further technical advantage that the shield will reduce reflected glare. Finally, it is a technical advantage that the mask and shield combination may be stored flat.

BRIEF DESCRIPTION OF THE DRAWINGS

For more complete understanding of the present invention and for further advantages thereof, reference is now made to the following Detailed Description taken in conjunction with the accompanying Drawings, in which:

FIG. 3 is a front plan view of an alternate embodiment of the present invention.

DETAILED DESCRIPTION OF THE INVENTION

Figure 1:
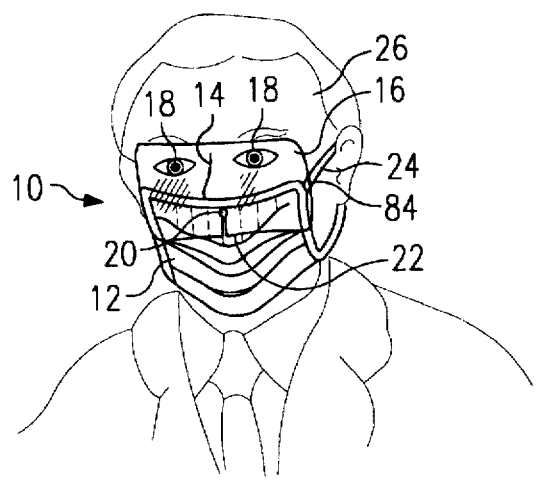
FIG. 1 is a perspective view of a liquid resistant visor on a face mask constructed in accordance with the present invention.
Figure 2:
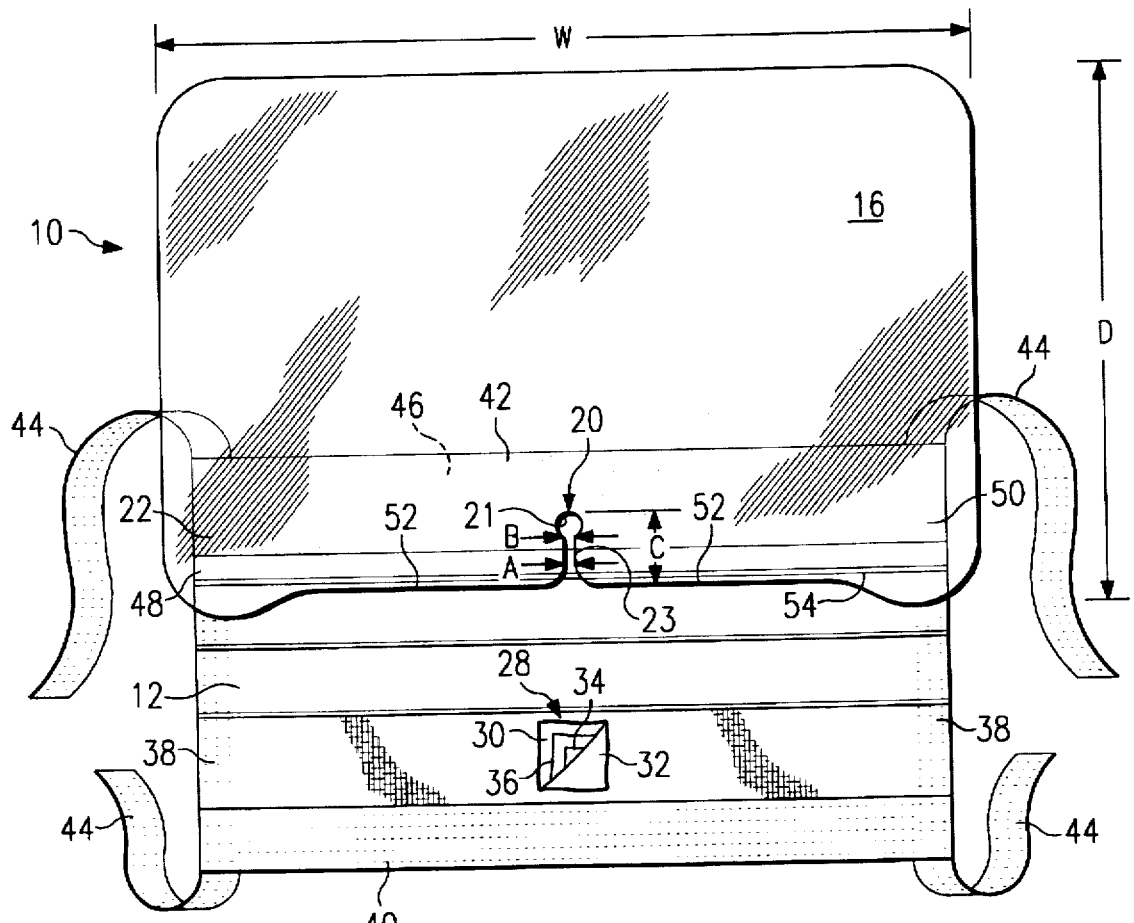
FIG. 2 is a front plan view of a mask and visor constructed in accordance with the present invention.

In FIGS. 1 and 2, like items are identified by like and corresponding numerals for ease of reference. Referring to FIG. 1, a liquid resistant shield 10 constructed in accordance with the present invention is shown in perspective. A mask 12 retards the flow of liquids from exterior the mask to the nose 14 and mouth of the wearer. A visor 16, fixed to opposite ends of the mask 12 inhibits liquids from splashing into the eyes 18 of the wearer, while allowing clear visibility to the wearer.

The visor 16 has a notch 20 formed therein to allow the visor 16 to bend without creasing. Bending the visor 16 allows the mask 12 to conform to the face of the wearer and still prevent liquid from splashing into the eyes 18. A darkened strip 22 may also be provided to further reduce glare. Elastic loops or tie strips 24 may be provided to removably attach the shield 10 to the head 26 of the wearer.

Referring to FIG. 2, the liquid resistant shield 10 constructed in accordance with the present invention is shown in plan view. The mask 12 is of the disposable layered type which is designed specifically to prevent or retard the passage of liquids from external the mask to the face of the wearer. The mask 12 is fabricated in general as disclosed in U.S. Pat. No. 4,635,628, Jan. 13, 1987, to Hubbard et al., and assigned to Tecnol, Inc., and is incorporated herein by reference.

Face mask 12, as shown by the cutaway portion at flap 28, has four layers of material with an external face of cover stock 30 as the outermost layer. The innermost layer, internal face 32, is constructed of a light weight, highly porous, softened, non-irritating, non-woven fabric, such as, for example, Dexter, Inc. product No. 3768. The internal face 32 is designed to prevent unwanted materials such as facial hair, loose fibers or beads of perspiration from contacting the next outermost layer which could cause a wicking effect to draw liquids therethrough. The internal face 32 also provides a comfortable surface for contact with the face of the wearer.

The next outermost layer comprises a barrier material 34 which is capable of differentiating between gases and liquids and may be, for example, Visqueen Film Products low density polyethylene Vispore X-6212. Non-wetting materials, such as used to form barrier 34, have small apertures which prevent liquids with a relatively high surface tension from passing therethrough yet will allow gases with a low surface tension to pass. It is preferable to have the apertures as large as possible to allow easy breathing, and yet small enough to retard the flow of liquids. The barrier material 34 is designed to freely pass gases in either direction, while restricting the passage of liquids in at least one direction. The mask 12 is constructed with the barrier material 34 positioned to restrict liquid passage from exterior the mask 12. Further description of the construction and operation of a barrier material may be found in U.S. Pat. No. 3,929,135, Dec. 30, 1975, to Thompson, assigned to Proctor & Gamble Co., which is incorporated herein by reference.

The next outermost layer is a filtration media 36 which is, for example, melt blown polypropylene or polyester. The filtration media 36 inhibits the passage of airborne bacteria in either direction which will prevent passage of germs to and from the wearer of the mask 12. The next and outermost layer is the treated cover stock 30 which comprises, for example, a non-woven material such as cellulose fiber. The cover stock 30 is preferably chemically coated or treated, for example, by spraying with a liquid repellant, to render the cover stock 30 resistant to liquids.

The cover stock 30 and the filtration media 36 serve as an aid to the barrier material 34 by slowing down any liquid that may be splashed, sprayed or thrown at the mask 12. By requiring the liquid to pass through these two outer layers prior to reaching the barrier material 34, the liquid will have less pressure and the barrier material 34 will be better able to prevent passage of the liquid.

The mask 12 can be provided with heat sealed or ultrasonically sealed edges 38, 40 and 42. The attaching devices, such as tie strips 24, may be integral with the sealed edges 38. The edge 42 may have an included stiffening device 46 to allow molding of the mask 12 around the wearer's nose, and thus, provide a better fit.

Visor 16 comprises a clear plastic film such as, for example, polyester or polyethylene, and is generally dimensioned to fit across the width of face mask 12 and extend over the eyes of the wearer. The plastic material comprising visor 16 preferably has a thickness of approximately 0.005 inches and must be stiff enough to prevent collapse yet flexible enough to bend.

Visor 16 is fixed to opposite edges of mask 12 at bond areas 48 and 50 which may be formed by adhesives, ultrasonic seals or heat seals. The bond areas 48 and 50 are only of sufficient area (approximately ¼ inch ×½ inch) to secure visor 16 to mask 12. It has been found that the visor 16 more easily adapts to the contours of the face of the wearer if the bond areas 48 and 50 do not extend across the entire width of mask 12. If the bond areas 48 and 50 were to extend across the mask 12 holding the visor 16 thereto, the likelihood of creasing the visor 16 would increase, as a wearer would attempt to force visor 16 to conform to the facial contours with the mask 12. The visor 16 is placed so that approximately ⅓ of its depth D covers mask 12 which is generally desirable for the best overall performance of shield 10. In a preferred embodiment, the depth D is 4-⅛ inches and a width W is 7-½ inches.

In the approximate middle of visor 16 adjacent the mask 12, is a notch 20. The notch 20 is designed to assist the visor 16 to gradually bend around the nose of a wearer without creasing. The notch 20 resembles a key hole which has been found to be the preferred design. The notch 20 comprises a circular portion 21 and a narrow slot 23. The circular portion 21 may have a ¼ inch radius and narrow slot 23 may have a tapered opening from ¼ inch at A to ⅛ inch at B. The length C of notch 20 may be approximately ⅞ inch. As mask 12 is fitted over the face of a wearer, the non-nose receiving notch 20 allows for any warping, bending and/or twisting action of the visor 16.

Visor 16 slopes gradually upward from proximate each bond area 48 and 50 to notch 20 to form arcuate surfaces 52. The notch 20 and the arcuate surfaces 52 allow visor 16 to bend when the mask 12 is placed over the face of the wearer to approximately place the arcuate surfaces 52 in contact with a first fold line 54. The contact of fold line 54 with arcuate surfaces 52 tends to close any gaps between the visor 16 and the mask 12.

A darkened strip 22 of material may be applied to the top edge of mask 12 adjacent visor 16. Strip 22 may comprise any suitable material such as a treated cover stock similar to outermost layer 30 of the mask 12. The strip 22 is preferably black in color to prevent or reduce glare and reflections into the eyes 18 of the wearer. The darkened strip 22 is used in the same fashion as, for example, the blackened areas under a football player's eyes.

In operation, the visor 16 is secured to the mask 12 at the bond areas 48 and 50. A wearer places the mask 12 over his/her mouth and nose with the visor 16 extending over his/her eyes. The tie strips 24 are tied around the head or ears to secure the protective shield 10 to the wearer. The wearer of the shield 10 may form the mask 12 as required to conform to the shape of his/her face by molding strip 46 to the contours of the face. Due to the combination of notch 20, the bond areas 48 and 50, and the arcuate surfaces 52, visor 16 will tend to bend around the face of the wearer. Additionally, the visor 16 will not be creased, and the area between arcuate surfaces 52 and first fold line 54 will be approximately in contact with each other. Thus, the wearer is protected from thrown or splashed liquids and may wear the mask comfortably for long periods of time without excessive glare or reflections.

Referring to FIG. 3, an alternate embodiment of a visor generally identified by the reference numeral 60 is shown in plan view. The visor 60 is constructed and used in substantially the same fashion as described above with the exception of first and second extended sides 62 and 64. Visor 60 has a keyhold notch 66 to allow for conformance to the face of a wearer.

Sides 62–64 are formed as an integral part of main body 68 along edges 70 and 72, respectively. Edges 70–72 are scored to allow sides 62–64 to easily fold into a transverse orientation against the side of a wearer's head. Thus sides 62–64 provide added protection to a wearer from liquids that may enter from the side.

It is to be understood that a visor constructed in accordance with the present invention may be fixed to a mask that is not designed to retard the flow of liquids. If so, the visor will still serve to protect the eyes from liquids, but the nose and mouth may quickly come into contact with the liquid and appropriate care should be taken. Although the present invention has been described with respect to a specific preferred embodiment thereof, various changes and modifications may be suggested to one skilled in the art, and it is intended that the present invention encompass such changes and modifications as fall within the scope of the appended claims.

We claim:

1. A liquid resistant shield to protect the eyes, nose and mouth of a wearer, comprising:

a fluid impervious transparent visor to protect the eyes of a wearer from liquid directed from the exterior of said visor;

a gas pervious but substantially liquid impervious mask formed from a plurality of material layers disposed adjacent to each other;

said material layers comprising a barrier which is capable of differentiating between gases and liquids, whereby gases may pass freely in either direction through said barrier while restricting the passage of liquids from the exterior of said mask;

a pair of connections formed between said mask and said visor by bond sites at opposite corners of said visor and said mask whereby said visor may be positioned over the eyes of a wearer; and means for improving the fit of said visor, said means comprising a lower edge of said visor having gradually sloping arcuate edges at opposite extreme lower corners of said visor where said gradually sloping arcuate edges extend below the central portion of the lower edge of said visor and are the only bond sites between said visor and said mask.

2. The shield of claim 1 wherein said visor further comprises a notch in the lower portion of said visor to allow said visor to gradually bend and approximately conform to the face of a wearer without creasing said visor whereby said notch, said connections and said arcuate edges cooperate with each other to allow said visor to conform to the face of a wearer and to close any gap between said visor and said mask.

3. The shield of claim 2 wherein said notch further comprises:

a cut out approximately at the center of said visor adjacent to said mask to facilitate the gradual and approximate conformance of said visor to the face of a wearer and to reduce the likelihood of reflections; and said cut out allowing said visor to gradually and approximately conform to the contours around a wearer's nose without creasing said visor.

4. The shield of claim 1 further comprising:

a malleable strip along an upper edge of said mask; and elastic loops to removably attach the shield to the head of a wearer.

5. A face mask and visor to protect the eyes, nose and mouth of a wearer, comprising:

said visor formed from a clear plastic film with gradually sloping arcuate edges at opposite extreme lower corners of said visor;

said visor having a lower portion fixed to said face mask by only bond areas at said opposite gradually sloping arcuate edges of said face mask to protect the eyes of a wearer from any liquid directed from the exterior of said visor;

a notch to separate said visor into portions which allow said visor to gradually bend and approximately conform to the face of a wearer without creasing of said visor; and said gradually sloping arcuate edges at said extreme lower corners of said visor, said bond areas and said notch cooperating with each other to allow said visor to conform to the face of a wearer and to close any gap between said visor and said mask.

6. The face mask and visor of claim 5 further comprising said notch approximately at the center of said visor adjacent to said mask to facilitate the gradual and approximate conformance of said visor to the face of a wearer in cooperation with said gradually sloping arcuate edges and to reduce the likelihood of reflections.

7. The face mask and visor of claim 5 wherein said visor further comprises:

a main body having a first extended side and a second extended side to provide added protection to said wearer from liquids;

said main body having a first edge and a second edge, respectively;

said first extended side and said second extended side attached respectively with said first edge and said second edge; and said first edge and said second edge scored to allow said first extended side and said second extended side to easily fold into a transverse orientation against the side of a wearer's head.

8. The face mask and visor of claim 5 further comprising elastic loops to removably attach the face mask and visor to the head of a wearer.

9. A face mask and visor to protect the eyes, nose and mouth of a wearer, comprising:

said visor formed from a clear plastic film;

said visor having a lower portion fixed to said face mask by bond areas at opposite edges of said face mask to protect the eyes of a wearer from any liquid directed from the exterior of said visor;

a notch to separate said visor into portions which allow said visor to gradually bend and approximately conform to the face of a wearer without creasing of said visor;

gradually sloping arcuate edges at extreme lower corners of said visor adjacent to said bond areas with said mask whereby said notch, said bond areas and said arcuate edges cooperate with each other to allow said visor to conform to the face of a wearer and to close any gap between said visor and said mask; and said notch comprising a slot and an enlarged portion formed at the upper end of said slot.

10. A disposable face mask and visor to protect the eyes, nose and mouth of a wearer, comprising:

said visor formed from a clear plastic film;

said visor having a main body with a lower portion fixed to said face mask by only bond areas at opposite edges of said face mask to protect the eyes of a wearer from any liquid directed from the exterior of said visor;

a gradually sloping arcuate edge extending from each extreme lower corner of said visor adjacent to said bond areas;

said gradually sloping arcuate edges extending towards each other along the lower portion of said visor whereby said bond areas and said arcuate edges cooperate with each other to allow said visor to conform to the face of a wearer and to close any gap between said visor and said mask; and said main body having a first extended side and a second extended side to provide added protection to a wearer from liquids.

11. A visor for connection with a face mask to protect the eyes, nose and mouth of a wearer, comprising:

said visor having a main body formed from a clear plastic film to protect the eyes of said wearer from any liquid directed from the exterior of said visor;

said visor having a lower portion for connection with said face mask;

said main body having a first extended side and a second extended side to provide added protection for a wearer's eyes from liquids;

a notch in said lower portion of said visor to allow said visor to gradually bend and approximately conform to the face of a wearer without creasing of said visor; and said notch having a slot with an enlarged portion formed at the upper end of said slot.

12. A visor for connection with a face mask to protect the eyes of a wearer comprising:

said visor having a main body formed from a clear plastic film;

said main body having a first edge and a second edge with a first side and a second side extending respectively from said first edge and said second edge to provide added protection for a wearer's eyes from liquids;

said visor comprising a notch in a lower portion of said visor to allow said visor to gradually bend and approximately conform to the face of a wearer without creasing of said visor; and said notch comprising a slot having an enlarged portion formed at an upper end of said slot.

13. A disposable liquid shield to protect the eyes, nose and mouth of a wearer, comprising:

a liquid resistant disposable mask dimensioned to fit over the mouth and nose of said wearer, said mask being resistant to the passage of liquids from exterior said mask;

a visor to cover the eyes of a wearer, said visor fixed to said mask at opposite ends thereof, and a darkened portion formed on said mask adjacent to said visor to reduce the likelihood of reflections.

14. A face mask and visor to protect the eyes, nose and mouth of a wearer, comprising:

said visor formed from a clear plastic film;

said visor having a lower portion fixed to said face mask by only bond sites at opposite edges of said face mask to protect the eyes of said wearer from any liquid directed from the exterior of said visor;

said visor having a lower edge with a portion cutout near the center of said lower edge;

gradually sloping arcuate edges at extreme lower corners of said visor adjacent to said bond sites with said mask whereby said cutout, said bond sites and said arcuate edges cooperate with each other to allow said visor to conform to the face of a wearer and to close any gap between said visor and said mask; and means for improving the fit of said visor, said means comprising a lower edge of said visor having said gradually sloping arcuate edges at on opposite extreme lower corners of said visor where said gradually sloping arcuate edges extend below the central portion of the lower edge of said visor and are the only bond sites between said visor and said mask.

* * * * *